United States Patent
Nasirizarandi et al.

(10) Patent No.: US 11,159,077 B2
(45) Date of Patent: Oct. 26, 2021

(54) HYBRID HYSTERESIS MOTOR

(71) Applicants: Reza Nasirizarandi, Zanjan (IR);
Seyed Mojtaba Aghamirsalim, Tehran (IR)

(72) Inventors: Reza Nasirizarandi, Zanjan (IR);
Seyed Mojtaba Aghamirsalim, Tehran (IR)

(*) Notice: Subject to any disclaimer, the term of this patent is extended or adjusted under 35 U.S.C. 154(b) by 763 days.

(21) Appl. No.: 15/641,147

(22) Filed: Jul. 3, 2017

(65) Prior Publication Data

US 2017/0310199 A1    Oct. 26, 2017

Related U.S. Application Data

(60) Provisional application No. 62/358,003, filed on Jul. 3, 2016.

(51) Int. Cl.
| | |
|---|---|
| *H02K 19/08* | (2006.01) |
| *H02K 1/14* | (2006.01) |
| *H02K 3/48* | (2006.01) |
| *H02K 1/02* | (2006.01) |
| *H02K 16/02* | (2006.01) |
| *H02K 19/10* | (2006.01) |

(52) U.S. Cl.
CPC .............. *H02K 19/08* (2013.01); *H02K 1/02* (2013.01); *H02K 1/14* (2013.01); *H02K 1/146* (2013.01); *H02K 3/48* (2013.01); *H02K 16/02* (2013.01); *H02K 19/106* (2013.01)

(58) Field of Classification Search
CPC ............ H02K 19/08; H02K 1/02; H02K 1/14; H02K 1/146; H02K 3/48; H02K 16/02; H02K 19/106

USPC ........................................................ 310/162
See application file for complete search history.

(56) References Cited

U.S. PATENT DOCUMENTS

| | | | | |
|---|---|---|---|---|
| 3,068,374 A | * | 12/1962 | Bekey | H02K 19/08 310/162 |
| 3,524,091 A | * | 8/1970 | Suzuki | H02K 19/08 310/162 |
| 4,578,610 A | * | 3/1986 | Kliman | H02K 1/16 310/156.35 |
| 6,392,378 B1 | | 5/2002 | Kasper et al. | |

(Continued)

FOREIGN PATENT DOCUMENTS

| | | |
|---|---|---|
| CA | 2615111 C | 3/2011 |
| CN | 101924438 A | 12/2010 |

(Continued)

OTHER PUBLICATIONS

A.G. Jack, Combined Radial and Axial Permanent Magnet Motors Using Soft Magnetic Composites, 9th International Conference on Electrical Machines and Drives, 1999, pp. 25-29.

(Continued)

*Primary Examiner* — Jianchun Qin
(74) *Attorney, Agent, or Firm* — Bajwa IP Law Firm; Haris Zaheer Bajwa

(57) ABSTRACT

A hybrid hysteresis motor is disclosed. The hybrid hysteresis motor includes a stator with, a plurality of axial slots on a first base-end and a plurality of radial slots on an inner surface. The motor further includes an output shaft, a first axial-flux rotor mounted on the output shaft and associated with the stator, and a radial-flux rotor mounted on the output shaft and disposed inside the stator.

8 Claims, 17 Drawing Sheets

(56) References Cited

U.S. PATENT DOCUMENTS

| | | | |
|---|---|---|---|
| 6,891,306 | B1 | 5/2005 | Soghomonian et al. |
| 7,034,422 | B2 | 4/2006 | Ramu |
| 10,476,362 | B2 * | 11/2019 | Hunstable ............... H02K 21/26 |
| 2002/0047329 | A1 * | 4/2002 | Sashino ............... H02K 1/2733 |
| | | | 310/43 |
| 2009/0001831 | A1 | 1/2009 | Cho et al. |
| 2014/0009025 | A1 | 1/2014 | Hosek et al. |
| 2014/0285048 | A1 | 9/2014 | Seo et al. |
| 2016/0079836 | A1 * | 3/2016 | Aoyama ............... H02K 11/33 |
| | | | 310/68 D |

FOREIGN PATENT DOCUMENTS

| | | |
|---|---|---|
| CN | 104716754 A | 6/2015 |
| CN | 104883018 A | 9/2015 |
| WO | 2015193562 A1 | 12/2015 |
| WO | 2015193563 A1 | 12/2015 |
| WO | 2016003014 A1 | 1/2016 |

OTHER PUBLICATIONS

Mohammad Modarres, Rotor design to improve dynamic performance of axial flux hysteresis motors, IET Electric Power Applications, 2014, vol. 9, Issue 1, pp. 44-49.

Tomotsugu Kubota, Hysteresis Motor Using Magnetically Anisotropic Fe—Cr—Co Magnet, IEEE Transactions on Magnetics, Nov. 1998, vol. 34, No. 6, pp. 3888-3896.

Teymoor Ghanbari, Hysteresis Motor Using Heat Treated Fe—Cr—Ni—Mo—C Steel Alloy, J. Electrical Systems, Dec. 2014, vol. 11, Issue 1, pp. 49-60.

Genjiro Waku, Radial Flux Type Hysteresis Motor with Reaction Torque-Numerical Analysis of Hysteresis Motor Using Finite Element method, IEEE Transactions on Magnetics, Sep. 1987, vol. 23, No. 5, pp. 3845-3852.

Reza Nasiri-Zarandi, A Novel Hybrid Hysteresis Motor with Combined Radial and Axial Flux Rotors, IEEE Transactions on Industrial Electronics, Oct. 5, 2015, vol. 63, Issue 3, pp. 1684-1693.

* cited by examiner

HYBRID HYSTERESIS MOTOR

CROSS-REFERENCE TO RELATED APPLICATION

This application claims the benefit of priority from U.S. Provisional Patent Application Ser. No. 62/358,003, filed on Jul. 3, 2016, and entitled "A HYBRID HYSTERESIS MOTOR WITH A COMBINED AXIAL-RADIAL FLUX STRUCTURE," which is incorporated herein by reference in its entirety.

TECHNICAL FIELD

The present disclosure generally relates to hysteresis motors, and particularly to a hysteresis motor with a combined axial-radial flux structure.

BACKGROUND

Synchronous hysteresis motors are self-starting motors with some advantageous characteristics, such as flat speed-torque characteristics, low starting current and noise level, structural integrity and a simple mechanical configuration and drive system. Hysteresis motors may be suitable for applications such as gyroscopes, video head drivers, compressors, pumps and timing applications. However, hysteresis motors may have some drawbacks, such as low power-factor and efficiency, and limited hysteresis torque, which is proportional to the area of the hysteresis loop and the volume of the rotor material.

A hysteresis motor may be a radial flux hysteresis motor (RFHM) or an axial flux hysteresis motor (AFHM). An AFHM may have some advantages over an RFHM, such as a higher torque-to-volume ratio, a higher efficiency, a compact and flat construction, a higher utilization of the active materials, and a more efficient ventilation and cooling.

In addition to the hysteresis component of the output torque, hysteresis motors have a variable component that is known as eddy-current or asynchronous torque. The inherent self-starting characteristic of hysteresis motors may be affected by hysteresis and eddy-current components. In order to improve the output torque and the self-starting characteristic, a combination of a high energy density permanent magnet (PM) and hysteresis materials may be utilized to develop PM-hysteresis motors, or alternatively, multi-stack combinations of the axial flux hysteresis motors may be developed.

A PM-Hysteresis motor may face some problems, especially in applications that need a sufficient amount of the asynchronous torque (i.e., an advantageous inherent self-starting characteristic). This problem may be related to the breakdown torque of PMs in asynchronous mode, which is added to the load torque and should be handled by the hysteresis materials of the rotor. In other words, the selected hysteresis material should be strong enough to overcome these torques. Also, advantageous aspects of a hysteresis motor including the simple mechanical configuration of the rotor and the drive system are diminished in a PM-Hysteresis motor.

A multi-stack combination of an axial hysteresis motor may improve the efficiency and output torque. However, the axial hysteresis motor may be associated with issues such as manufacturing difficulties in the mechanical production process, the winding process, and core losses. Also, in some cases the designer may face limitations in using high-quality hysteresis materials in the design procedure, as these materials are typically expensive and metallurgical, magnetic and mechanical aspects of their production remain complicated.

Therefore, there is a need in the art for designs and methods of new hysteresis motors with improved self-starting characteristics, output torques, and efficiencies. There is further a need in the art for designs and methods that allow for an optimal use of the available space in the structure of a hysteresis motor in order to improve self-starting characteristics, output torques, and efficiencies of the hysteresis motors.

SUMMARY

This summary is intended to provide an overview of the subject matter of the present disclosure, and is not intended to identify essential, elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes a hybrid hysteresis motor including a stator with a plurality of first axial slots formed or otherwise disposed along a first base-end of the stator and a plurality of radial slots formed or otherwise disposed along an inner surface of the stator. In addition, the motor includes an output shaft and a first axial-flux rotor associated with the stator, where the first axial-flux rotor is mounted on the output shaft. The first axial-flux rotor is arranged such that an axial air gap is formed or extends between the first axial-flux rotor and the first base-end of the stator. Furthermore, a radial-flux rotor is associated with the stator, where the radial-flux rotor is mounted on the output shaft and disposed inside the stator. The radial-flux motor is arranged such that a radial air gap is formed or extends between the radial-flux rotor and the stator.

The above general aspect may include one or more of the following features. According to some implementations, the stator of the hybrid hysteresis motor may further include a plurality of second axial slots formed or otherwise disposed along a second base-end of the stator. In some cases, a second axial-flux rotor may be associated with the stator, where the second axial-flux rotor is mounted on the output shaft and forms an axial air gap that extends between the second axial-flux rotor and the second base-end of the stator. According to another implementation, the stator may be made of materials selected from soft magnetic composites, soft ferrites or combinations thereof. In some cases, the plurality of radial slots may include 24 to 36 radial slots and/or the plurality of first axial slots include 24 to 36 axial slots.

In another general aspect, the present disclosure describes a reverse hybrid hysteresis motor including a stator with a plurality of first axial slots formed or disposed along a first base-end of the stator and a plurality of radial slots formed or disposed along an outer surface. In addition, the motor includes an output shaft and a first axial-flux rotor associated with the stator, where the first axial-flux rotor is mounted on the output shaft. The first axial-flux rotor is arranged such that an axial air gap is formed or extends between the first axial-flux rotor and the first base-end of the stator. Furthermore, a radial-flux rotor is associated with the stator, where the radial-flux rotor is mounted on the output shaft and disposed outside the stator. The radial-flux rotor is arranged such that a radial air gap is formed or extends between the radial-flux rotor and the stator.

The above general aspect may include one or more of the following features. According to some implementations, the stator of the reverse hybrid hysteresis motor may further include a plurality of second axial slots formed or otherwise disposed along a second base-end of the stator. In some cases, a second axial-flux rotor may be associated with the stator, where the second axial-flux rotor is mounted on the output shaft and forms an axial air gap that extends between the second axial-flux rotor and the second base-end of the stator. According to another implementation, the stator may be made of materials selected from soft magnetic composites, soft ferrites or combinations thereof. In some cases, the plurality of radial slots may include 24 to 36 radial slots and/or the plurality of first axial slots includes 24 to 36 axial slots.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1A:
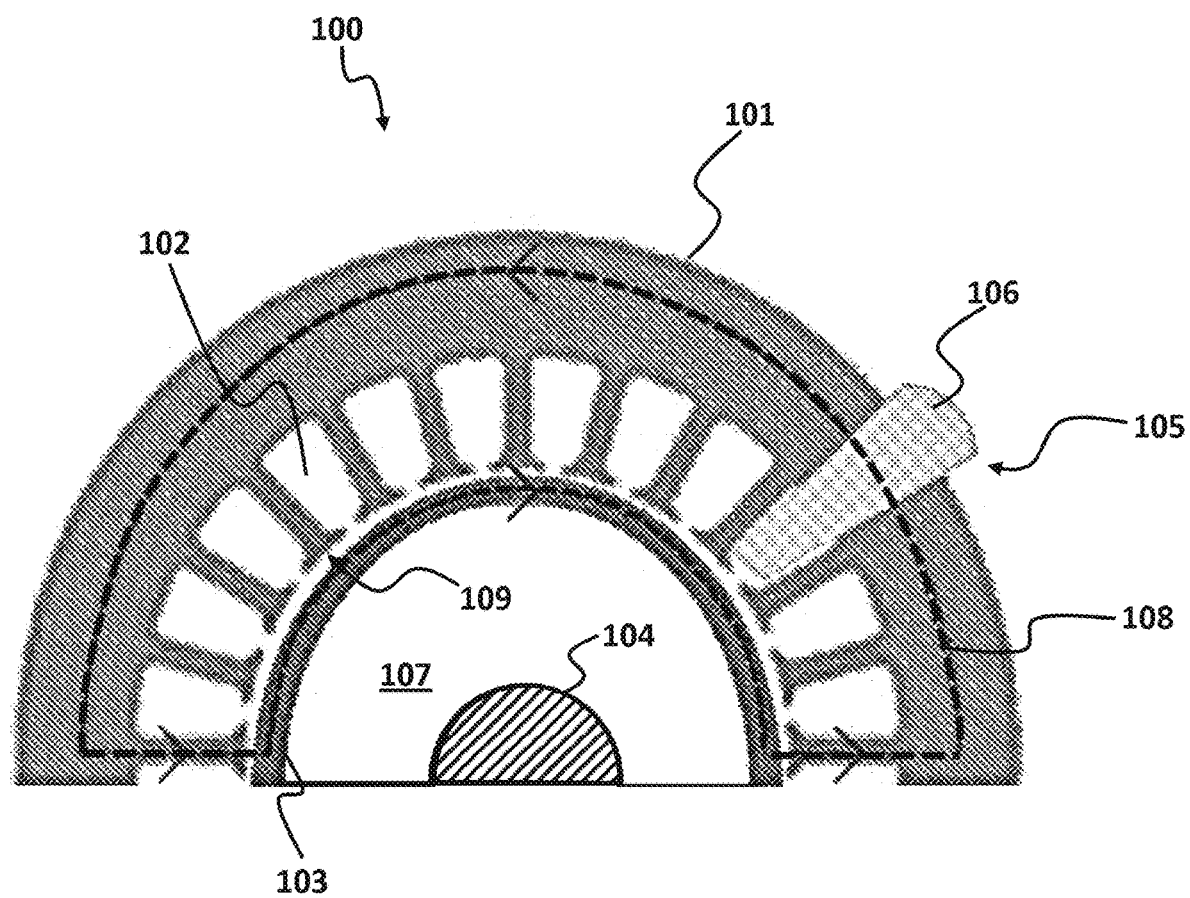
FIG. 1A illustrates a top-view of a symmetrical structure of one pole of a radial-flux hysteresis motor.

FIG. 1A illustrates a top-view of a symmetrical structure of one pole of a radial-flux hysteresis motor 100 that includes a stator 101 with a number of radial slots 102, a ring-shaped rotor 103 that is located inside the stator 101, and an output shaft 104. The radial slots 102 are used to host the stator winding 105 (only coil 106 of the winding 105 is illustrated in FIG. 1A). The ring-shaped rotor 103 may be mounted on the output shaft 104 and it may be rotatable therewith. In some cases a ring holder 107 may be utilized to mount the ring-shaped rotor 103 on the output shaft 104. In a radial-flux hysteresis motor such as the radial hysteresis motor 100, the stator 101 (i.e., stator core) is made of laminated steel sheets. The laminated stator core is only capable of carrying the flux lines in a single radial direction. A general direction of the flux lines is shown in FIG. 1A by dashed line 108. There is an air gap 109 between the ring-shaped rotor 103 and the stator 101.

Figure 1B:
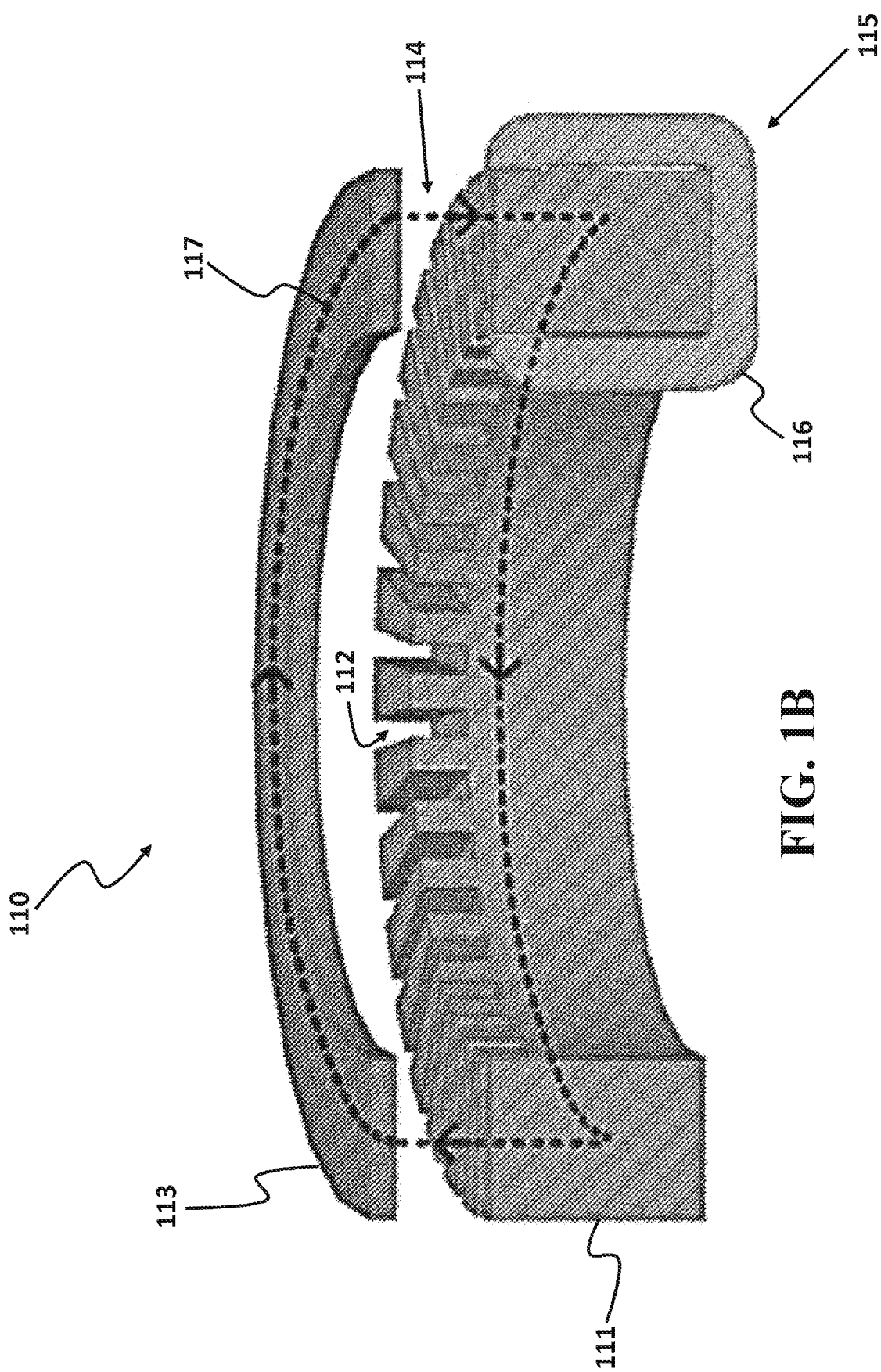
FIG. 1B illustrates a symmetrical structure of one pole of a single-sided axial-flux hysteresis motor.

FIG. 1B illustrates a symmetrical structure of one pole of a single-sided axial-flux hysteresis motor 110 that includes a stator 111 with a number of axial slots 112, and a disk-shaped rotor 113 that may be mounted on an output shaft (not shown in FIG. 1B) above the axial slots 112 with an air gap 114 between disk-shaped rotor 113 and axial slots 112. The axial slots 112 of the single-sided axial flux hysteresis motor 110 are utilized for hosting stator winding 115. For the sake of simplicity only coil 116 of the stator winding 115 is shown in FIG. 1B. In an axial-flux hysteresis motor such as the axial-flux hysteresis motor 110, the stator 111 (i.e., stator core) is made of rolled steel sheets. The rolled stator core is only capable of carrying the flux lines in a single axial direction. A general direction of the flux lines is shown in FIG. 1A by dashed line 117.

The present disclosure is directed to a hybrid hysteresis motor with a stator design that is capable of ferrying flux lines in both radial and axial directions. Benefits from this feature include, but are not limited to, the ability to combine axial-flux and radial-flux rotors in a hysteresis motor, thereby providing the advantages of both axial-flux hysteresis motors and radial-flux hysteresis motors in a single structure. As mentioned hereinabove in connection with FIGS. 1A and 1B, in axial-flux hysteresis motors the stator is only capable of ferrying the flux lines in an axial direction due to the rolled structure of the stator, and in radial-flux hysteresis motors, the stator is only capable of ferrying the flux lines in a radial direction due to the laminated structure of the stator. However, according to one or more aspects of the present disclosure, both disk-type axial-flux rotors and ring-type radial-flux rotors may be combined and utilized to form a hybrid hysteresis motor. In a hybrid hysteresis motor, the stator is made of a substantially solid magnetic material associated with isotropic ferromagnetic behavior and homogeneous magnetic characteristic in both the axial and radial directions. As a result, the stator is able to ferry the flux lines in both radial and axial directions.

Figure 2A:
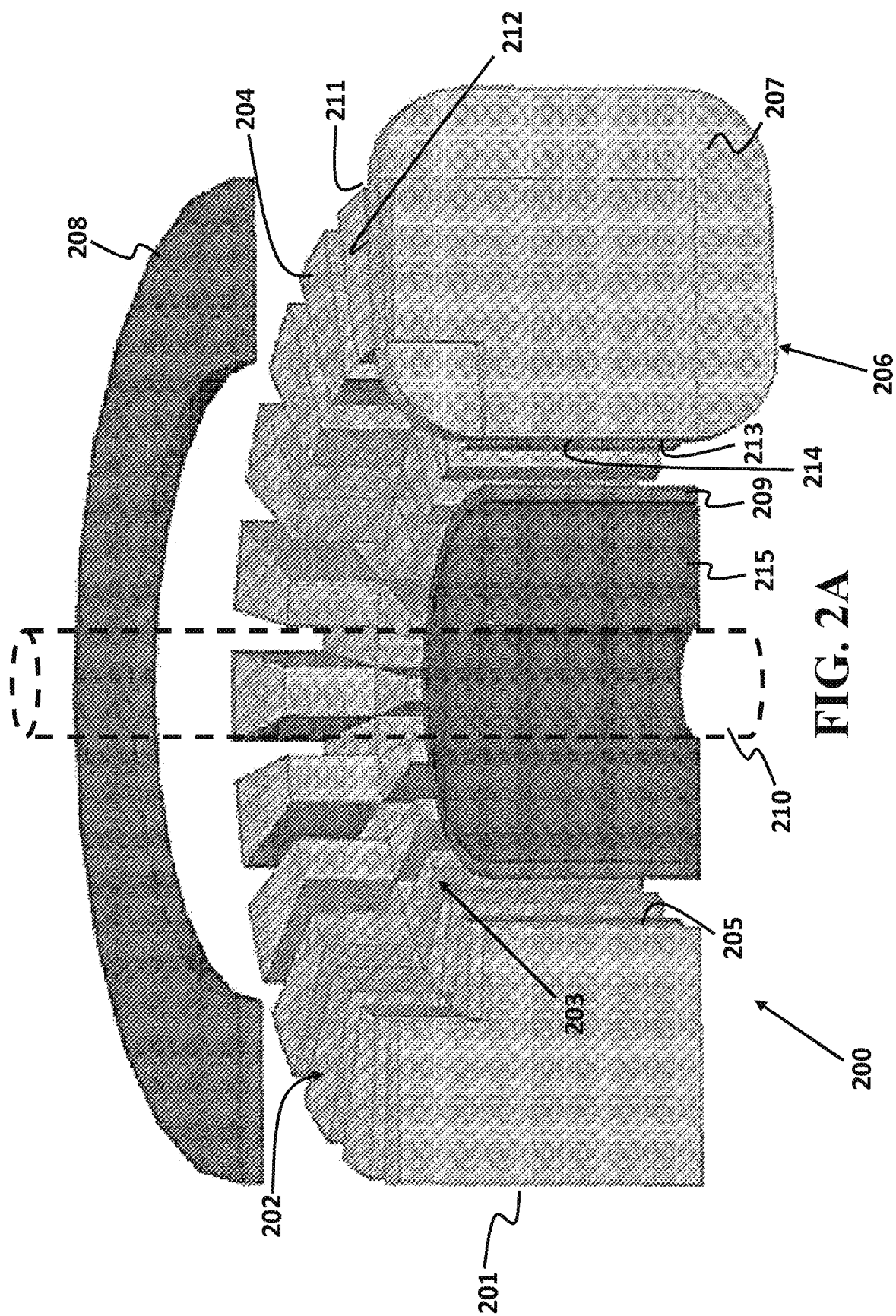
FIG. 2A illustrates one pole of a hybrid hysteresis motor with one set of axial slots on the stator, according to an implementation of the present disclosure.

FIG. 2A illustrates one pole of a hybrid hysteresis motor 200, according to one implementation of the present disclosure. The hybrid hysteresis motor 200 includes a stator 201 with a number of axial slots 202 and a number of radial slots 203 thereon. In some implementations, the axial slots 202 are formed on an end-surface 204 of the stator 201 and the radial slots 203 are formed on an inner surface 205 of the stator 201. In some implementations, the stator 201 includes between 24 and 36 axial slots 202 and between 24 and 36 radial slots 203. However, in other implementations, there may be a fewer or greater number of axial slots and/or radial slots. The radial slots 203 and the axial slots 202 host the stator winding 206. For the sake of simplicity, only coil 207 of the stator winding 206 is illustrated in FIG. 2A. The hybrid hysteresis motor 200 further includes a rotor combination including an axial-flux rotor 208 and a radial-flux rotor 209. The rotors are mounted on an output shaft 210 and are rotatable therewith. In one implementation, the radial-flux rotor 209 may be mounted on the output shaft via a ring holder 215.

In different implementations, the stator 201 may be made of a solid or substantially solid magnetic material associated with isotropic ferromagnetic behavior and homogeneous magnetic characteristics in both the axial and radial directions. The magnetic material allows the stator 201 to ferry the flux lines in both radial and axial directions. In some implementations, the solid magnetic material may be selected from soft magnetic composites (SMCs) or a soft ferrite.

For purposes of this disclosure, an SMC may be understood to refer to materials including ferromagnetic powder particles that are surrounded by an electrical insulating film. An SMC offers several advantages over traditional laminated steel cores in most applications. For example, SMC includes advantages such as three-dimensional (3D) isotropic ferromagnetic behavior, very low eddy current loss, relatively low total core loss at medium and high frequencies, a prospect of greatly reduced weight, and other such advantages. According to some implementations, the solid magnetic material may include Somaloy 130i-SGTechnologies or other grades of solid magnetic materials.

As noted above, in other implementations, the magnetic material can include a soft ferrite. For purposes of this disclosure, a soft ferrite refers to a kind of ceramic compound composed of iron oxide ($Fe_2O_3$) that is chemically combined with one or more additional metallic oxides such as MnO or other metallic oxides. Soft ferrites are ferromagnetic, which means that soft ferrites may be magnetized or attracted to a magnet, while being electrically nonconductive, which results in a low core loss at high frequencies.

Referring again to FIG. 2A, a stator core such as the stator 201 can be made of an SMC or a soft ferrite. The stator 201 is capable of carrying the flux lines in both radial and axial directions as SMCs and soft ferrites show homogeneous magnetic characteristics in both the radial and axial directions. This allows for the utilization of both the radial-flux rotor 209 and the axial-flux rotor 208 in the hybrid hysteresis motor 200 simultaneously. Benefits from this feature include but are not limited to the generation of additional torque in the output of the hysteresis motor, as the output torque of a hysteresis motor is proportional to the volume of the hysteresis material of the rotors. Furthermore, the efficiency of the hybrid hysteresis motor may be higher due to a higher output torque.

In the implementation of FIG. 2A, the winding 206 that is assembled on the stator 201 may be a 3-phase type. A first arm of each coil (for example, first arm 211 of the coil 207) is disposed within an axial slot, such as axial slot 212, and a second arm of each, coil (for example, second arm 213 of the coil 207) is disposed within a radial slot, such as radial slot 214. Therefore, in some implementations, at least two arms of a coil function as, active current paths, permitting an optimum use of the winding coils.

In some implementations where the stator core is made of a soft ferrite, in view of the relatively small electrical conductivity of the ferrite core, the use of an insulator sleeve in the radial and axial slots before assembling the winding may not unnecessary. However, in some other implementations, in order to help prevent damage in the winding process, a thin layer of an industrial insulator may be disposed on the stator core before winding. The core loss is smaller in the hybrid hysteresis motor due to this negligible ferrite core electrical conductivity. The soft ferrite materials such as Mn—Zn type materials that may be used in the stator of the hybrid hysteresis motor show comparatively low losses at high frequencies in comparison with silicon steels. Hence, the core losses will be much smaller in the hybrid hysteresis motor.

Figure 2B:
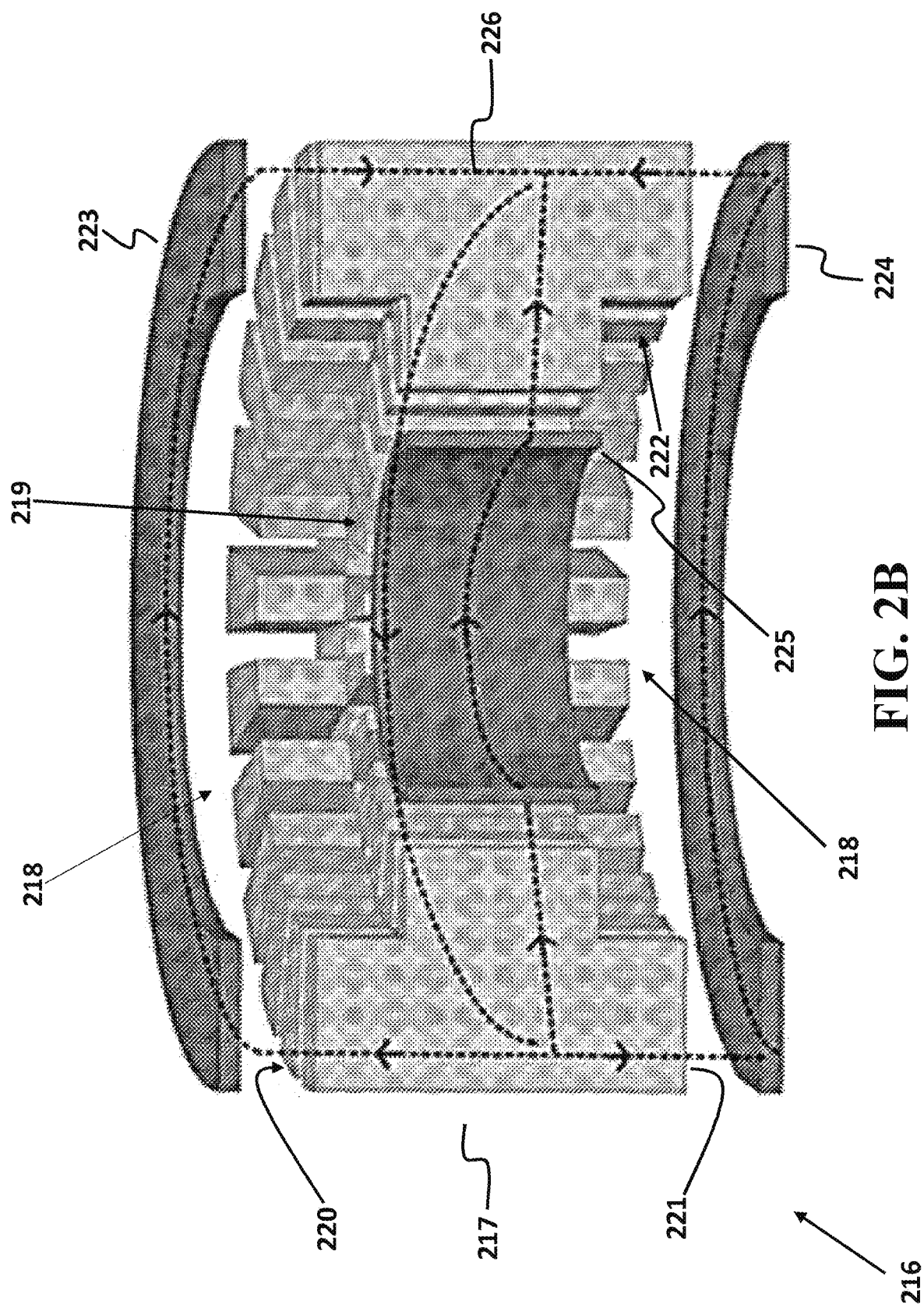
FIG. 2B illustrates one pole of a hybrid hysteresis motor with two sets of axial slots on the stator, according to an implementation of the present disclosure.

FIG. 2B illustrates one pole of a hybrid hysteresis motor 216, according to another implementation of the present disclosure. The hybrid hysteresis motor 216 includes a stator 217 with two sets of axial slots 218 and a number of radial slots 219 thereon. In some implementations, a first set of axial slots 218 are formed on a first end-surface 220 of the stator 217, a second set of axial slots 218 are formed on a second end-surface 221 of the stator 217, and radial slots 219 are formed on an inner surface 222 of the stator 217. The first end-surface 220 can also be referred to as a first base-end and the second end-surface 221 can also be referred to as a second base-end. As shown in FIG. 2B, in one implementation, the inner surface 222 can be understood to extend between the first end-surface 220 and the second-end surface 221. Furthermore, the first end-surface 220 and the second end-surface 221 can refer to external or outward-facing surfaces that are disposed relatively distally to the center of the mechanism, while the inner surface 222 is an inward-facing surface that is disposed more proximally to the center of the mechanism. In one implementation, the first end-surface 220 and the second-end surface 221 are arranged along substantially parallel planes. Furthermore, in some implementations, at least some portions of the inner surface 222 extend in a substantially perpendicular arrangement relative to one or both of the first end-surface 220 and the second end-surface 221, though other portions of the inner surface 222 can also be arranged in a substantially parallel fashion relative to the end-surfaces.

The hybrid hysteresis motor 216 further includes a combination rotor including a first axial-flux rotor 223, a second axial-flux rotor 224, and a radial-flux rotor 225 that are each mounted on an output shaft and are rotatable therewith. A general direction of flux lines is shown in FIG. 2B by dashed line 226, The rotor combination (i.e., first axial-flux rotor 223, second axial-flux rotor 224, and radial-flux rotor 225) is associated with a larger volume of hysteresis material in the hybrid hysteresis motor 216, which can increase the output torque of the hybrid hysteresis motor 216, particularly in comparison with an axial-flux hysteresis motor or a radial-flux hysteresis motor with similar dimensions.

Figure 2C:
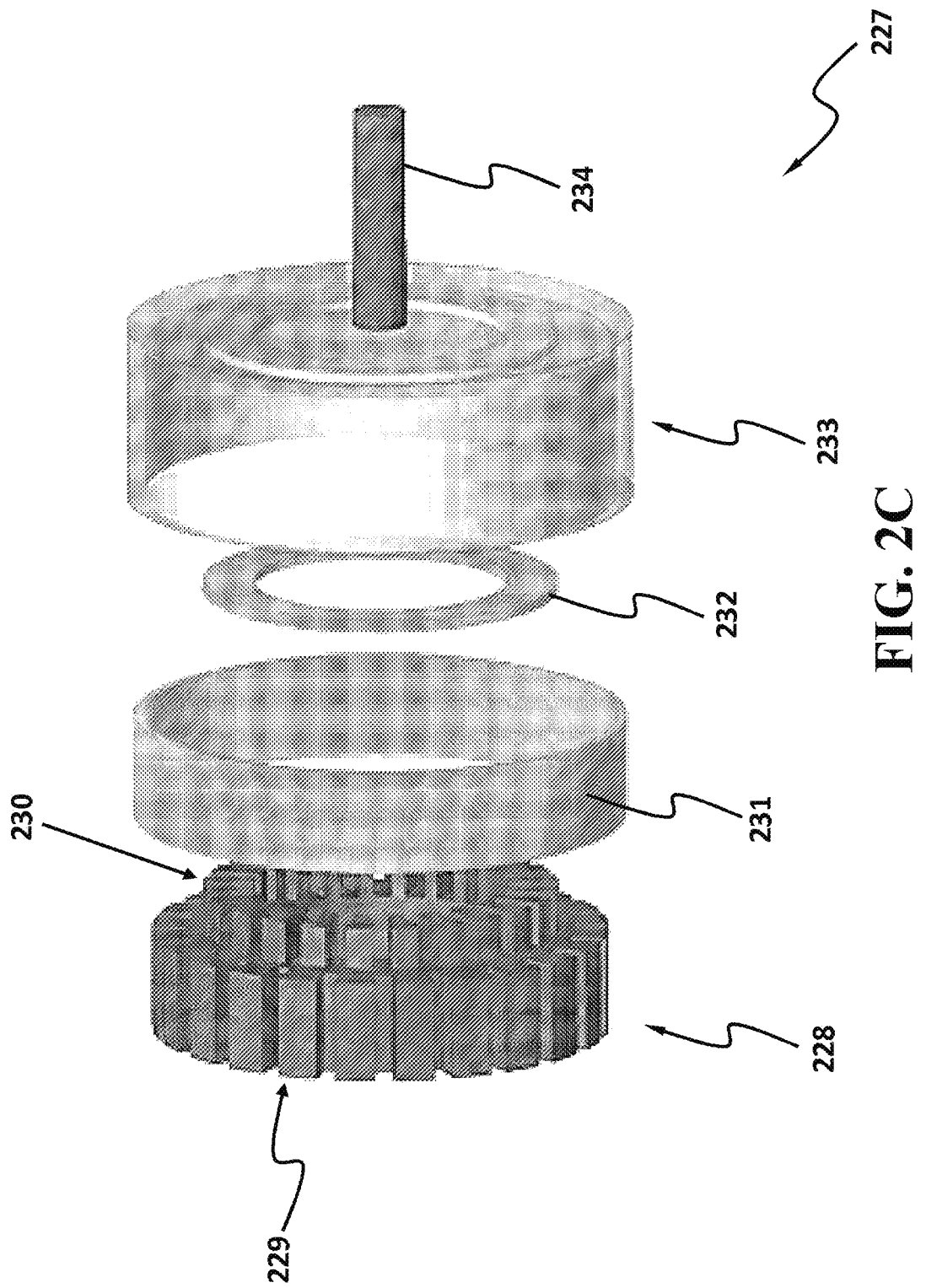
FIG. 2C is an exploded view of a reverse hysteresis motor, according to an implementation of the present disclosure.

FIG. 2C illustrates an exploded view of a reverse hybrid hysteresis motor 227, according to an implementation of the present disclosure. The reverse hysteresis motor can include any one or more of the features and characteristics described with reference to the hybrid hysteresis motor described herein. The reverse hybrid hysteresis motor 227 includes a reverse stator 228 with a number of axial slots 230 and a number of radial slots 229 thereon. In some implementations, the axial slots 230 are formed on an end-surface of the reverse stator 228 and the radial slots 229 are formed on an outer surface of the reverse stator 228. The radial slots 229 and the axial slots 230 host the stator winding. The reverse hybrid hysteresis motor 227 further includes a rotor combination including an axial-flux rotor 232 and a radial-flux rotor 231. Each rotor is mounted on an output shaft 234 via a holder 233 and is rotatable with the shaft. As shown in FIG. 2C, in one implementation, the radial-flux rotor 231 encompasses the radial slots 229 rather than being disposed inside the stator. Thus, in one implementation of the reverse hybrid hysteresis motor, the radial-flux rotor 231 is located external to the stator mechanism, in contrast to the hybrid hysteresis motor described earlier, in which the radial-flux rotor was disposed within or inside of the stator. In some implementations, the reverse hybrid hysteresis motor is configured to provide substantially similar benefits as those described earlier for the hybrid hysteresis motor.

EXAMPLE 1

Figure 3:
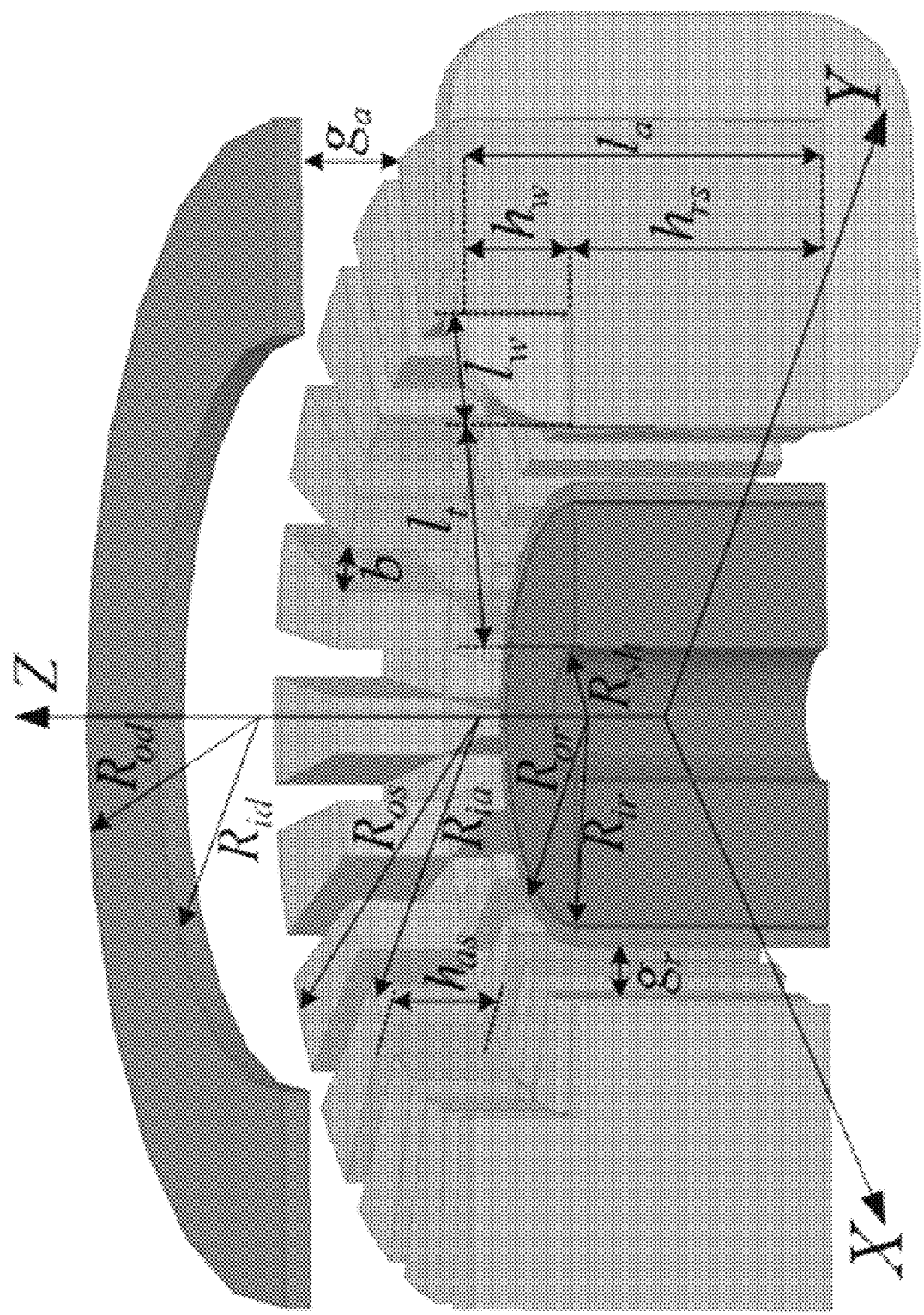
FIG. 3 illustrates one pole of a hybrid hysteresis motor, according to an implementation of the present disclosure.

In this example a hybrid hysteresis motor is described, consistent with an implementation of the present disclosure. The design parameters of the hybrid hysteresis motor of EXAMPLE 1 are set forth in Table 1 below. In this example, the stator core is made of Mn—Zn ferrite and the rotors are made of Nickel alloy steel. FIG. 3 illustrates a one pole of a hybrid hysteresis motor, as described in this example. For purposes of clarity, design parameters used in FIG. 3 are designated by symbols as identified in Table 1 below.

TABLE 1

Design Parameters of an example hybrid hysteresis motor

| Parameter | Designated by | Value | Unit |
|---|---|---|---|
| Outer radius of stator | $R_{os}$ | 60 | Mm |
| Outer radius of disk | $R_{od}$ | 60 | Mm |
| Inner radius of core axial part | $R_{ia}$ | 40 | Mm |
| Outer radius of ring | $R_{or}$ | 24 | Mm |
| Total axial length | $l_a$ | 40 | Mm |
| Slot opening | B | 5 | Mm |
| Axial slot height | $h_{as}$ | 12 | Mm |
| Height of radial slot | $h_{rs}$ | 28 | Mm |
| Thickness of ring | $t_r$ | 2 | Mm |
| Thickness of disk | $t_d$ | 3 | Mm |
| Number of poles | P | 2 | |
| Number of phases | M | 3 | |
| Radial air gap length | $g_r$ | 2 | Mm |
| Axial air gap length | $g_a$ | 2 | Mm |
| Total ampere-turn per pole per phase | NI | 200 | |
| Number of slot conductors | $N_{sl}$ | 50 | |
| Number of slots | $n_s$ | 24 | |
| Conductor diameter | $d_{con}$ | 0.5 | mm |

Figure 4A:
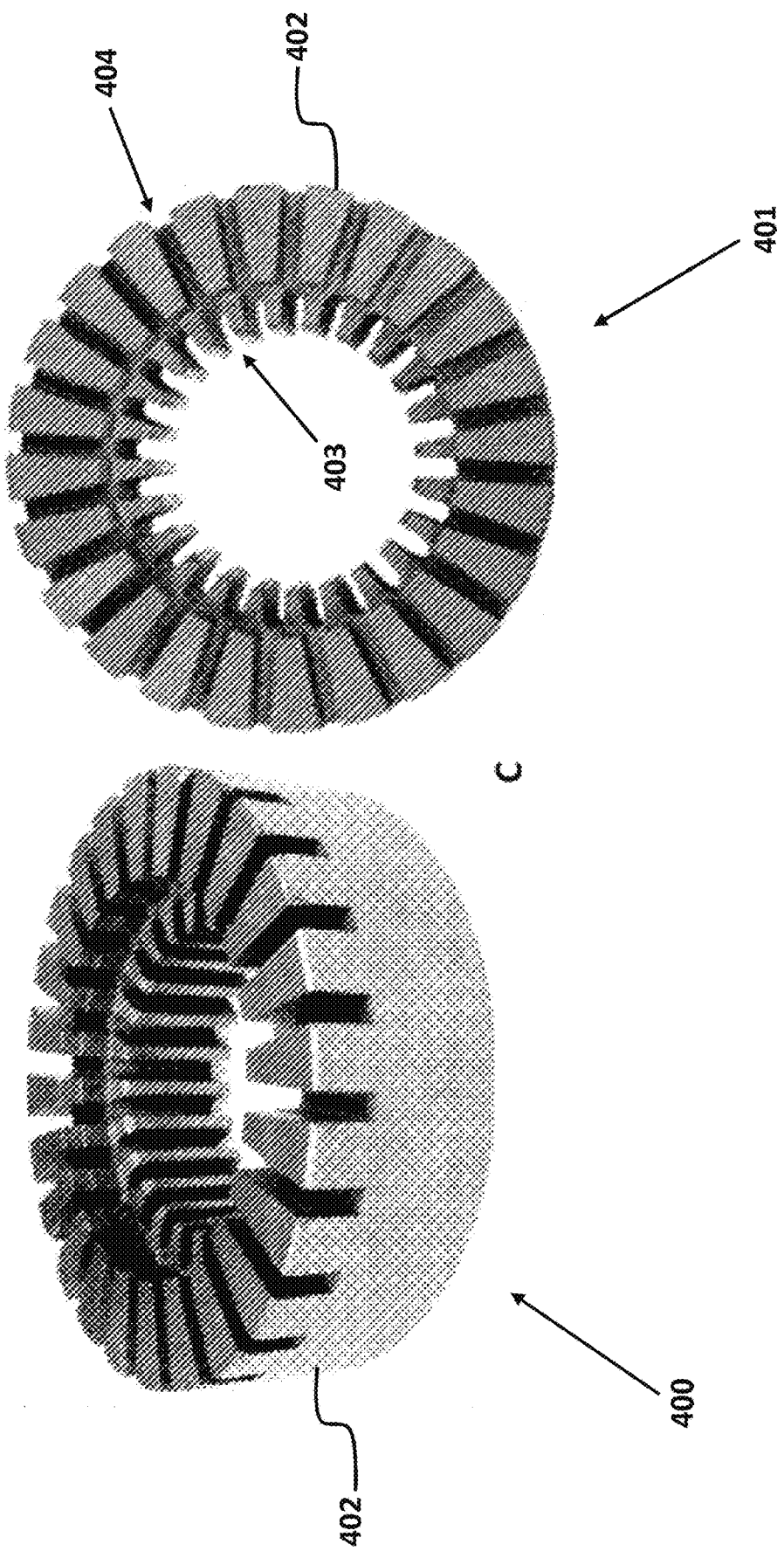
FIG. 4A illustrates a perspective view and a top view of a stator of a hybrid hysteresis motor, according to an implementation of the present disclosure.

FIG. 4A illustrates a perspective view 400 and a top view 401 of a stator 402 of the hybrid hysteresis motor as described in this example. Radial slots 403 and axial slots 404 are aligned. Thus, once a coil is wound around an axial slot, a first arm of the coil is disposed within the axial slot and a second arm of the coil is disposed within the radial slot. Furthermore, the radial slots 403 and the axial slots 404 share a common stator yoke.

Figure 4B:
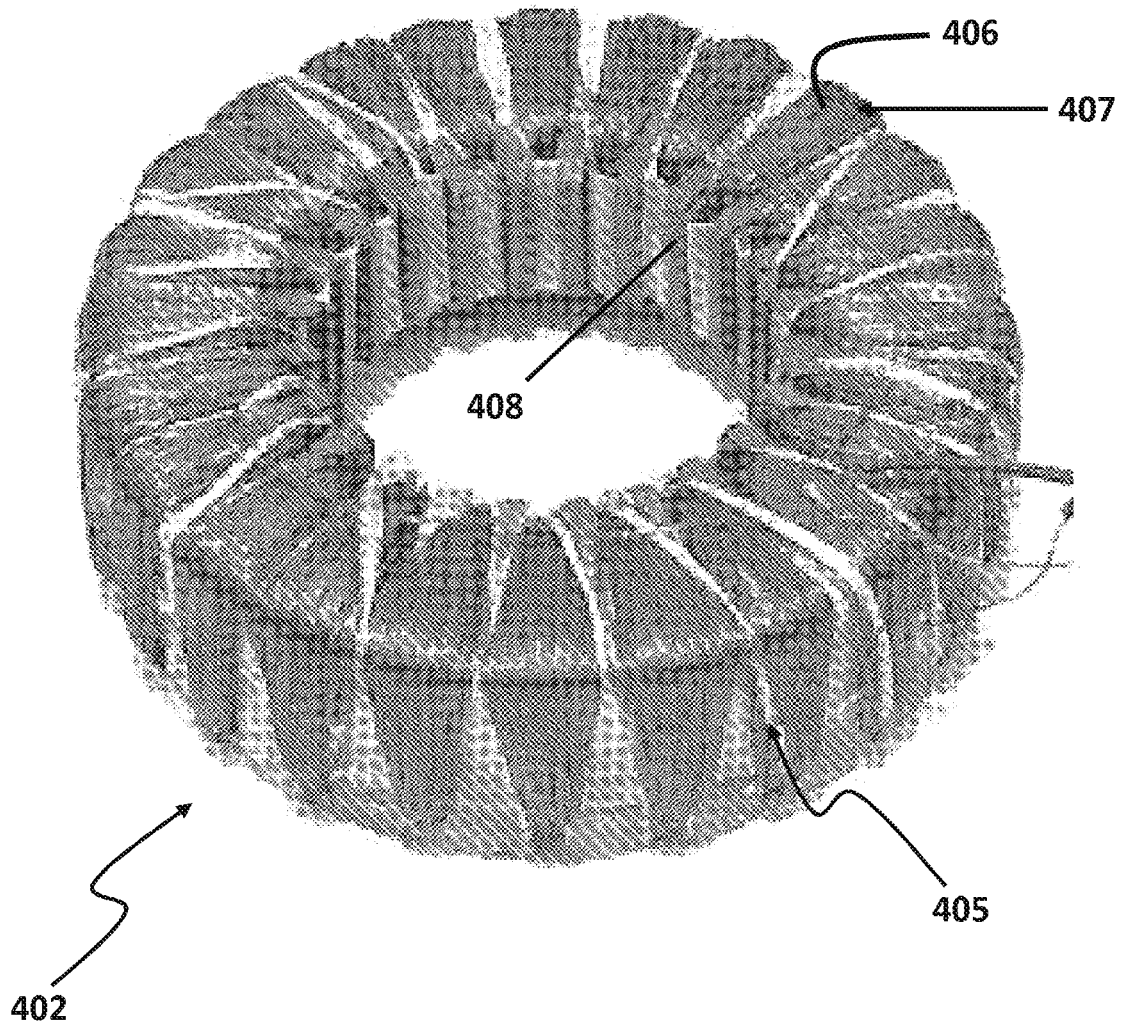
FIG. 4B illustrates an assembled winding on the stator, according to an implementation of the present disclosure.

FIG. 4B shows an assembled winding 405 on the stator 402. The winding 405 is a conventional 3-phase type, where two arms of a coil are located inside a radial slot and an axial slot. For example, radial arm 406 of coil 407 is located inside an axial slot and the axial arm 408 of coil 407 is placed inside a radial slot. In this example, the designed 3-phase winding 405 for the hybrid hysteresis motor is a single layer winding that has 200 turns of conductors in each phase in each pole. This corresponds to 50 turns of winding 405 in each slot. The diameter of each conductor is 0.5 mm$^2$. Referring to FIG. 4B, in this structure, at least two various arms of a coil play as active current paths. For example, radial arm 406 and axial arm 408 of coil 407 play as active current paths.

Figure 5A:
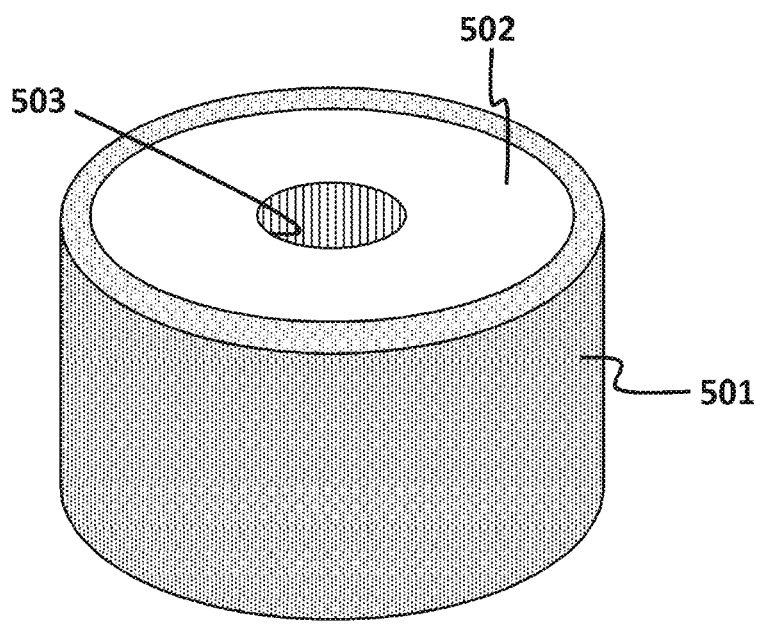
FIG. 5A is a schematic representation of a radial-flux rotor, according to an implementation of the present disclosure.

FIG. 5A illustrates an implementation of a radial-flux rotor 501 made of Nickel alloy steel. The radial-flux rotor 501 is supported on a ring holder 502 that is made of a non-conductive material, such as polyethylene. The ring holder 502 has a first central hole 503 that may be utilized for coupling ring holder 502 with an output shaft of the hybrid hysteresis motor.

Figure 5B:
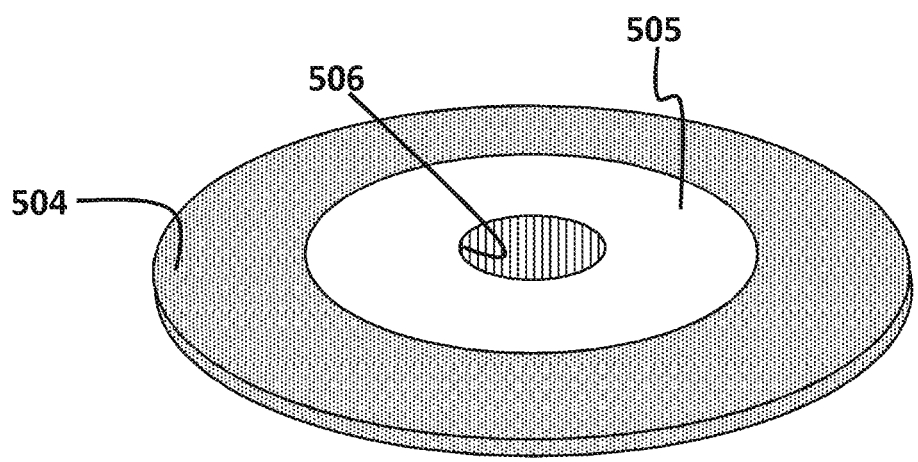
FIG. 5B is a schematic representation an axial-flux rotor, according to an implementation of the present disclosure.

FIG. 5B illustrates an implementation of an axial-flux rotor 504 made of Nickel alloy steel. The axial-flux rotor 504 is supported on a disc holder 505, which is made of a non-conductive material, such as polyethylene. The disk holder 505 has a second central hole 506 that may be utilized for coupling disk holder 505 with an output shaft of the hybrid hysteresis motor.

Figure 5C:
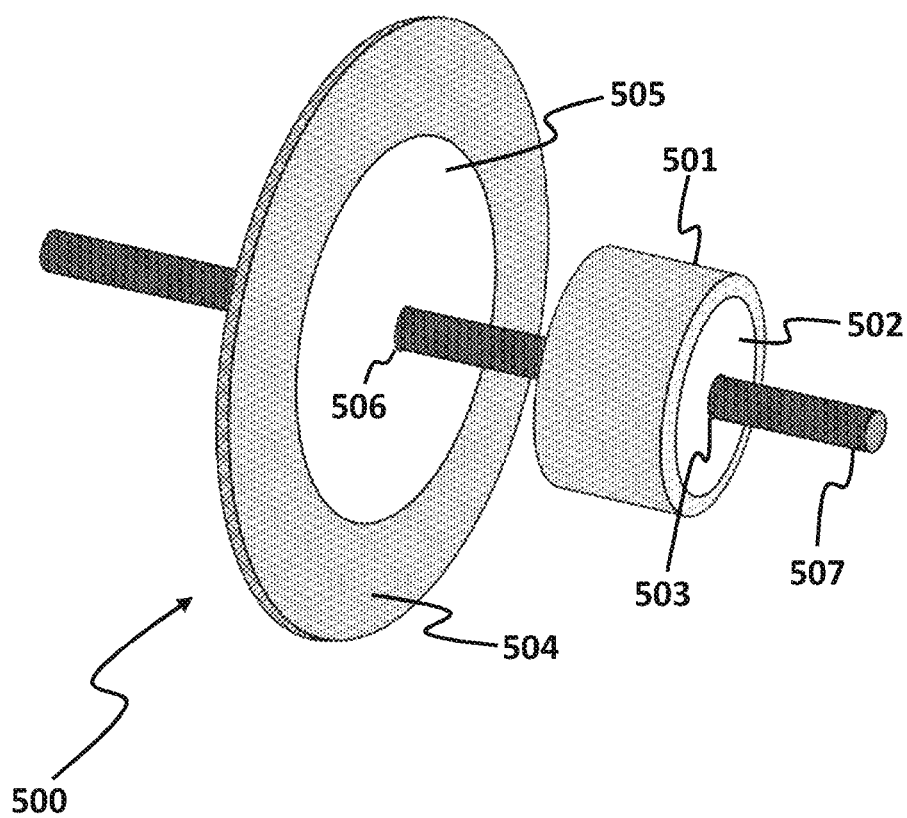
FIG. 5C illustrates an example of a rotor assembly for a hybrid hysteresis motor with a stator that has one set of axial slots, according to an implementation of the present disclosure.

FIG. 5C illustrates an example of a rotor assembly 500 for a hybrid hysteresis motor with a stator that has one set of axial slots. Radial-flux rotor 501 may be mounted on ring holder 502 and axial-flux rotor 504 may be mounted on disk holder 505. An output shaft may be received within first central hole 503 and second central hole 506, The output shaft 507 may then be coupled with ring holder 502 and disk holder 505.

Figure 5D:
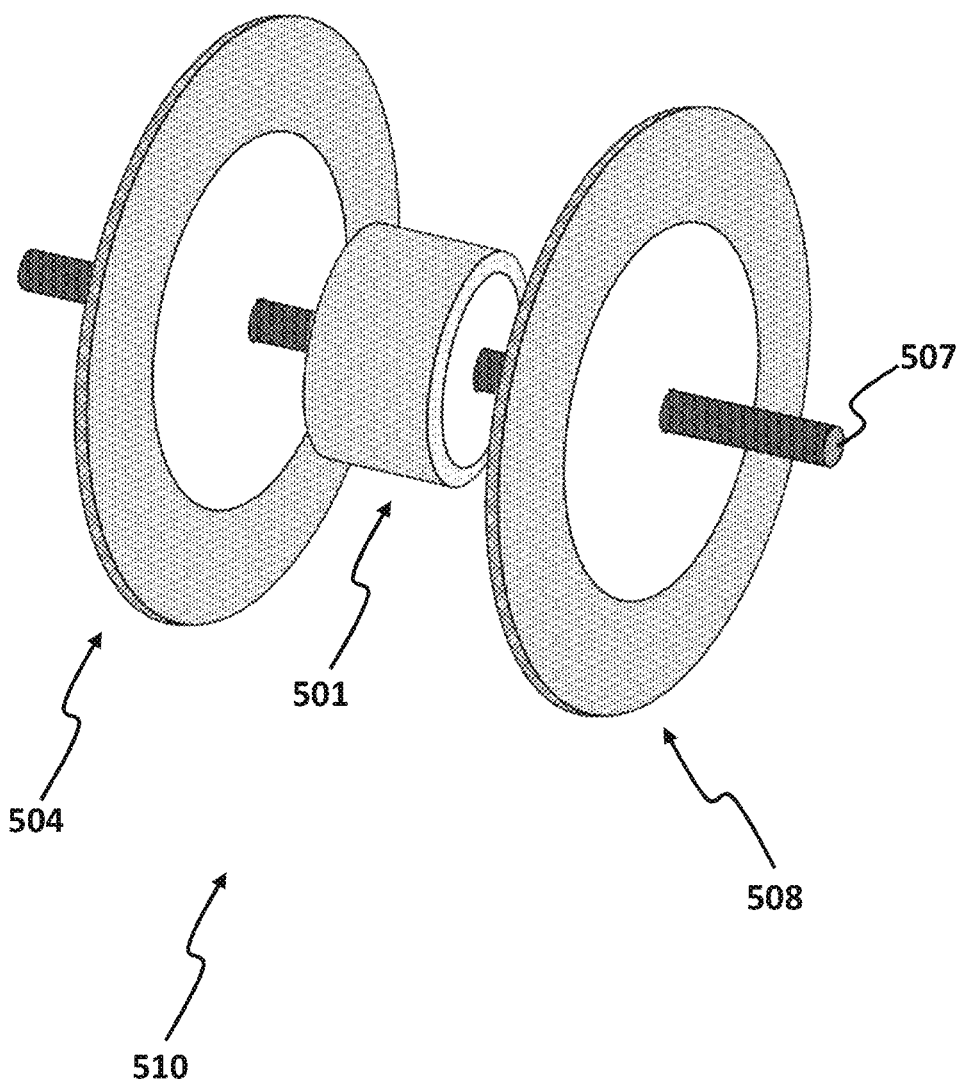
FIG. 5D illustrates an example of a rotor assembly for a hybrid hysteresis motor with a stator that has two sets of axial slots, according to an implementation of the present disclosure.

FIG. 5D illustrates an example of a rotor assembly 510 for a hybrid hysteresis motor with a stator that has two sets of axial slots. Radial-flux rotor 501 and two axial-flux rotors 504 and 508 may be mounted on the output shaft 507.

Figure 6:
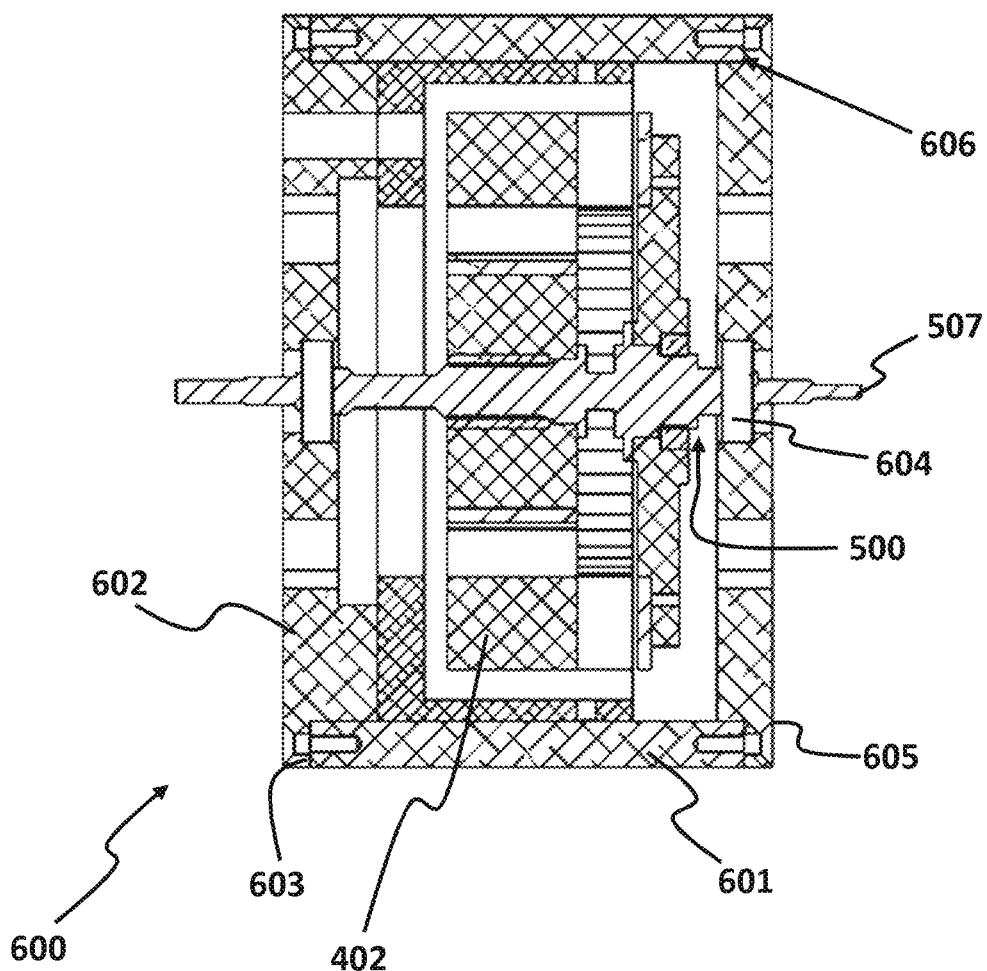
FIG. 6 illustrates a sectional view of an assembled hybrid hysteresis motor, according to an implementation of the present disclosure.

FIG. 6 illustrates a sectional view of an assembled hybrid hysteresis motor 600, consistent with one implementation of the present disclosure and EXAMPLE 1. The stator 402 may be housed inside an aluminum frame 601. Furthermore, a first cap 602 may be mounted on a first end-surface 603 of the aluminum frame 601. The rotor assembly 500 is then inserted inside the stator 402. The output shaft 507 may be coupled with a bearing 604 of a second cap 605 and the second cap 605 may be mounted on a second end-surface 606 of the aluminum frame 601.

EXAMPLE 2

In EXAMPLE 2 a test set-up was utilized for testing the hybrid hysteresis motor as described in detail in connection with EXAMPLE 1. In EXAMPLE 2, a sensitive dynamometer that includes an eddy-current coupler, a precise and adjustable PID controller, and a real time data acquisition system was used for testing the performance of the hybrid hysteresis motor. A highly accurate coupling connects the output shaft of the hybrid hysteresis motor to the dynamometer. All input and output parameters of the hybrid hysteresis motor are controlled by the controller and saved in the data acquisition system.

All tests were performed near the synchronous speed, as the magnetic operating point of a hysteresis motor at the synchronous speed is unstable with a small variation of the input voltage. The starting torque (asynchronous mode) in the hysteresis motors is greater than the synchronous torque due to the eddy-current component of the torque. Thus, in order to measure the output torque and other output parameters of the hybrid hysteresis motor, a multistage test is defined and was implemented in this example.

Figure 7A:
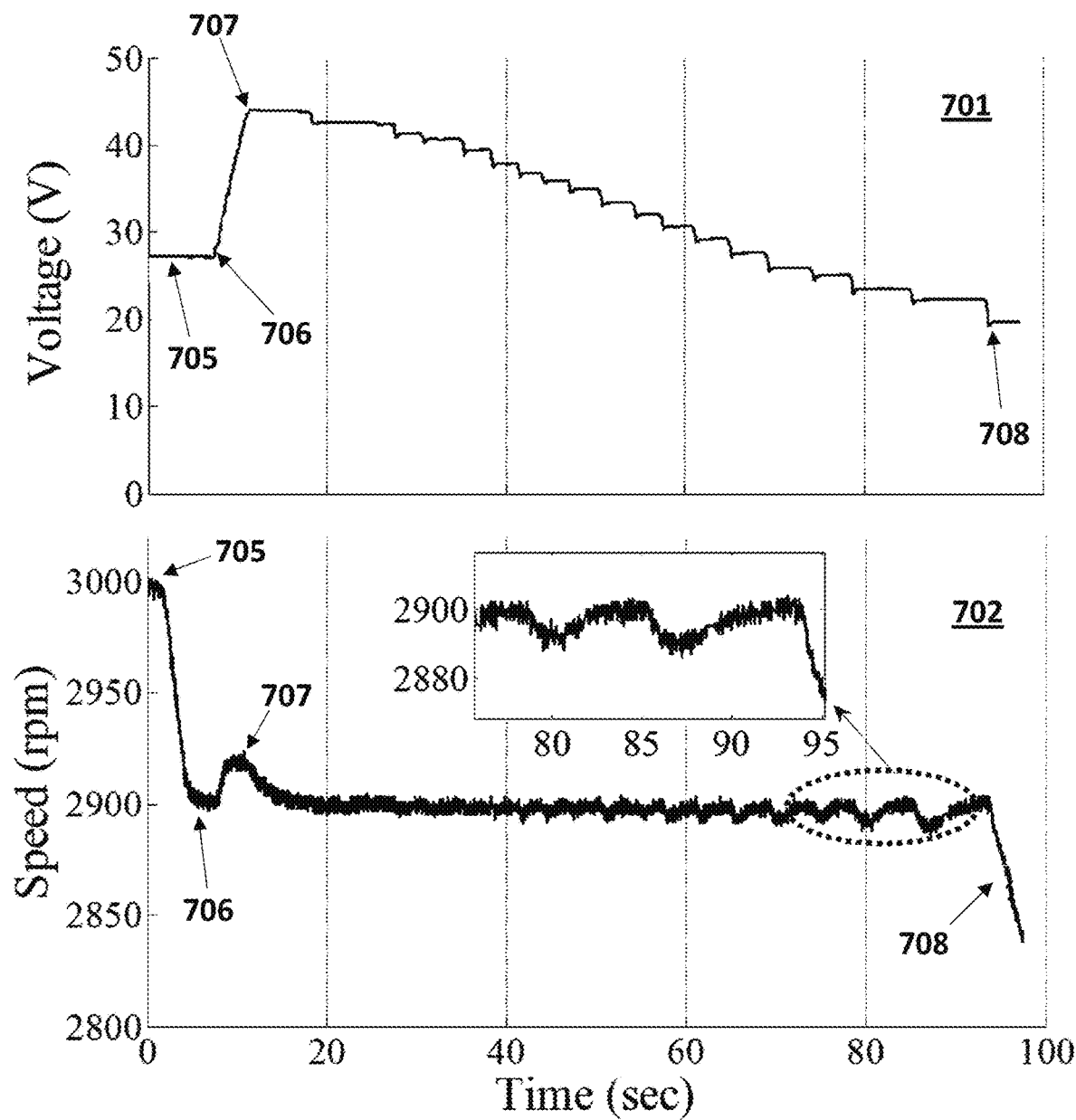
FIGS. 7A and 7B are graphs depicting samples of transient waveforms for tested motors, according to an implementation of the present disclosure.
Figure 7B:
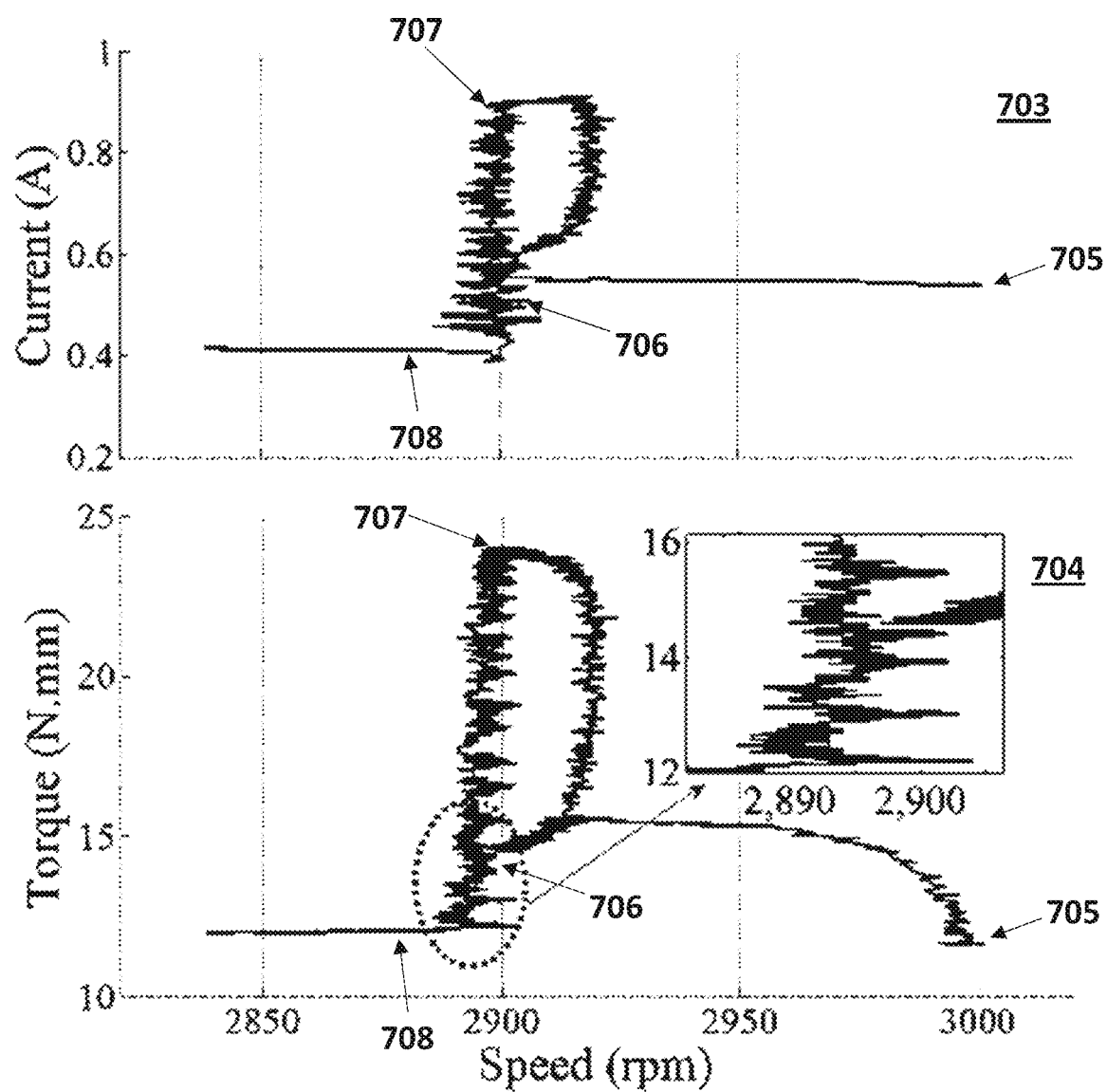

FIGS. 7A and 7B present samples of transient waveforms of the machine parameters during the tests. Referring to FIG. 7A, the transient waveforms shown in a first graph 701 depict input voltage versus test time, while the transient waveforms shown in a second graph 702 depict motor speed versus test time. In FIG. 7B, a third graph 703 depicts transient waveforms of current versus speed, and a fourth graph 704 depicts transient waveforms of output torque versus speed.

Before initiating the test and saving the data into the data acquisition system, some preparatory measures were performed to ensure that the motor and the bearings attained a stable temperature during a predetermined time period. During this period, the hybrid hysteresis motor operated in the synchronous mode, corresponding to an initial condition of the hybrid hysteresis motor state. This condition is identified as a first state 705 in the graphs shown in FIGS. 7A and 7B. In first state 705 the input voltage was set to a minimum value that maintained the machine at the synchronous speed.

Once the testing began, the PID controller of the dynamometer configured to control the load torque of the eddy-current coupler was utilized to limit the motor speed to a predefined value near the synchronous speed (2900 rpm). This state is identified as a second state 706 in the graphs of FIGS. 7A and 7B. As seen in fourth graph 704, by limiting the machine speed, the output torque of the machine increases, because the machine state changes from the synchronous to asynchronous mode (i.e., the eddy-current component of the torque will be added to the hysteresis torque). In this stage, as seen in first graph 701, the input voltage is kept constant.

The input voltage was then increased and set to a point corresponding to the saturation current of the hysteresis material. This state is identified as a third state 707 in the graphs of FIGS. 7A and 7B. Referring to second graph 702, the motor speed rises in a substantially instantaneous manner as the input voltage increases, but it is controlled and limited to a pre-specified speed. The current and the torque of the motor in this transient interval increased and reached a maximum value, as illustrated in third graph 703 and fourth graph 704, respectively.

In order to measure the output parameters and evaluate the motor performance, the input voltage was reduced step by step, as illustrated in first graph 701. The reduction in voltage led to a decrease in the motor speed at each step, as seen in second graph 702. During the voltage reduction steps, the motor works toward overcoming the load torque (by inherent self-starting characteristics) and reaches the target speed of 2900 rpm. The reduction in the input voltage continues until the machine cannot overcome the load torque and reaches the 2900 rpm speed. This state is labeled as a fourth state 708 in the graphs of FIGS. 7A and 7B. At each step, the test parameters for which the output torque is maximized, the input and output powers, the terminal current, and the power factor of the machine were measured.

EXAMPLE 3

In this example, three hysteresis motors were tested: (1) the hybrid hysteresis motor as described in detail in connection with EXAMPLE 1, which is hereinafter referred to as "HARFHM"; (2) a hybrid hysteresis motor without the radial-flux rotor, which operates like an axial-flux hysteresis motor and is hereinafter referred to as "AFHM"; and (3) a hybrid hysteresis motor without the axial-flux rotor, which operates like a radial-flux hysteresis motor and is hereinafter referred to as "RFHM". The test setup as described above with reference to EXAMPLE 2 was used to perform the testing.

Figure 8:
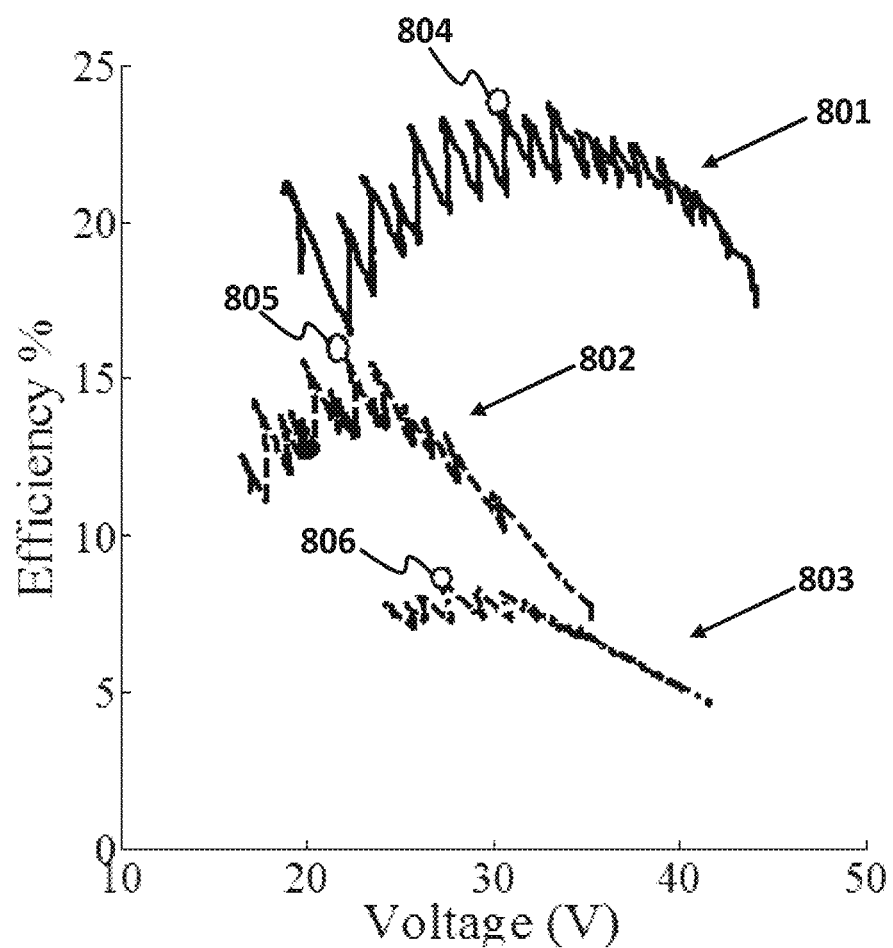
FIG. 8 is a graph depicting dynamic efficiencies of three tested motors versus the input voltage, according to an implementation of the present disclosure.

FIG. 8 illustrates dynamic efficiencies of the three tested motors versus the input voltage without the frictional torque of the test setup in the output torque. Referring to FIG. 8, first data series 801 shows the dynamic efficiencies of the HARFHM versus the input voltage, second data series 802 shows the dynamic efficiencies of the AFHM versus the input voltage, and third data series 803 shows the dynamic efficiencies of the RFHM versus the input voltage. The maximum efficiencies for each of first data series 801, second data series 802, and third data series 803 takes place at a different level of the input voltage. This can be a result of the different voltage-current characteristics of the HARFHM, AFHM, and RFHM structures corresponding to the optimum performance of the hysteresis material. For example, a first maximum efficiency 804 of the HARFHM corresponds to a 30 V input voltage; a second maximum efficiency 805 of the AFHM corresponds to a 22 V input voltage; and a third maximum efficiency 807 of the RFHM corresponds to a 27 V input voltage. It may be understood that the HARFHM outperformed the AFHM and the RFHM. Furthermore, as shown in FIG. 8, for all input voltages. The HARFHM has a higher efficiency in comparison with AFHM and RFHM. This may be a result of the higher output torque in HARFHM.

Figure 9:
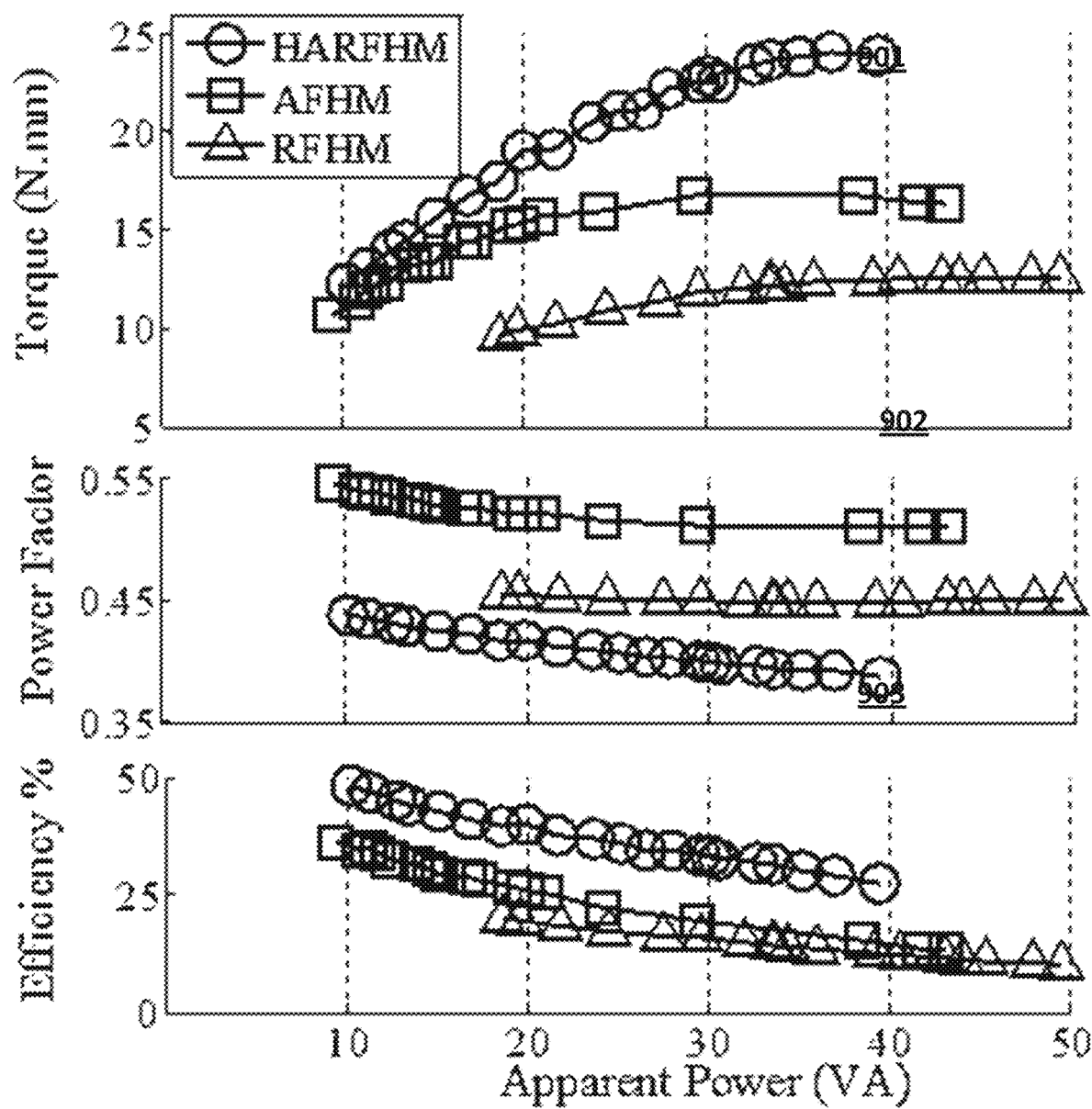
FIG. 9 is a graph of measured output torque versus apparent power (V.A); a graph of measured power factor versus apparent power; and a graph of measured efficiencies versus power factor, according to an implementation of the present disclosure.

FIG. 9 includes a first graph 901 illustrating measured output torque versus apparent power (VA); a second graph 902 of measured power factor versus apparent power; and a third graph 903 of measured efficiencies versus power factor. The measured data for HARFHM are designated by symbol "-O-"; the measured data for AFHM are designated by symbol "⊟"; and the measured data for RFHM are designated by symbol "▲".

Referring to first graph 901 of FIG. 9, the HARFHM, in comparison with AFHM and RFHM, has more output torques for lower input powers, which may lead to better efficiencies for all input powers, as illustrated in third graph 903. In addition, as shown in, second graph 902, the power factor of HARFHM is slightly lower than the power factors of AFHM and RFHM. With respect to the significant increase in the output torque shown in first graph 901, this decrease in the power factor is insignificant in cases of sensitive loads that need more torque. More developed torque corresponds to better self-starting characteristics.

The hybrid hysteresis motor consistent with implementations of the present disclosure is avoids the poor performance characteristics of conventional hysteresis motors, and provides improved output torque and efficiency. The hybrid hysteresis motor may incorporate the advantageous features of both the conventional axial-flux and radial-flux hysteresis motors by providing the features of both rotors in a single, stable structure. The hybrid hysteresis motor may be suitable for industrial applications, especially where an inherent self-starting characteristic is required.

While the foregoing has described what are considered to be the best mode and/or other examples, it is understood that various modifications may be made therein and that the subject matter disclosed, herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A hybrid hysteresis motor comprising:
   a stator comprising:
      a first stator region comprising a first base-end and a plurality of first axial slots disposed along the first base-end;
      a second stator region comprising a second base-end and a plurality of second axial slots disposed along the second base-end;
      a radial slot region comprising an inner surface, a plurality of radial slots disposed along the inner surface,
      wherein:
         the first stator region and the second stator region extending a first distance from an outer edge of the stator from a top perspective and the radial slot region extending a second distance from the outer edge of the stator from the top perspective, the second distance greater than the first distance, and the stator comprising ferromagnetic particles enclosed by an electric insulating film;
   an output shaft;
   a first axial-flux rotor associated with the stator, the first axial-flux rotor comprising a steel discoid rotor mounted around a first non-conductive disc holder, the first non-conductive disc holder mounted on the output shaft with an axial air gap extending between the first axial-flux rotor and the first base-end of the stator; and
   a radial-flux rotor associated with the stator, the radial-flux rotor comprising a steel annular rotor mounted around a non-conductive ring holder,
   the non-conductive ring holder mounted on the output shaft, the radial-flux rotor disposed inside the stator with a radial air gap extending between the radial-flux rotor and the stator,
   wherein the first axial slots and the radial slots of the stator host a stator winding.

2. The hybrid hysteresis motor according to claim 1, further comprising a second axial-flux rotor associated with the stator, wherein the second axial-flux rotor is mounted on the output shaft with an axial air gap extending between the second axial-flux rotor and the second base-end of the stator.

3. The hybrid hysteresis motor according to claim 1, wherein the plurality of first axial slots includes 24 to 36 axial slots.

4. The hybrid hysteresis motor according to claim 1, wherein the plurality of radial slots includes 24 to 36 radial slots.

5. The hybrid hysteresis motor according to claim 1, further comprising a second non-conductive disc holder, the second axial-flux rotor comprising a steel discoid rotor mounted around the second non-conductive disc holder.

6. The hybrid hysteresis motor according to claim 1, wherein the first non-conductive disc holder and the second non-conductive disc holder are made of polyethylene.

7. The hybrid hysteresis motor according to claim 1, wherein the steel discoid rotor is made of Nickel alloy steel.

8. The hybrid hysteresis motor according to claim 1, wherein the steel annular rotor is made of Nickel alloy steel.

* * * * *